US012726939B2

(12) United States Patent
Li

(10) Patent No.: US 12,726,939 B2
(45) Date of Patent: Sep. 1, 2026

(54) POSITIONING MEASUREMENT METHOD AND APPARATUS THEREFOR

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 300 days.

(21) Appl. No.: 18/681,229

(22) PCT Filed: Aug. 6, 2021

(86) PCT No.: PCT/CN2021/111325

§ 371 (c)(1),
(2) Date: Feb. 5, 2024

(87) PCT Pub. No.: WO2023/010571

PCT Pub. Date: Feb. 9, 2023

(65) Prior Publication Data

US 2024/0314729 A1 Sep. 19, 2024

(51) Int. Cl.
*H04W 64/00* (2009.01)
*H04W 72/231* (2023.01)

(52) U.S. Cl.
CPC ......... *H04W 64/00* (2013.01); *H04W 72/231* (2023.01)

(58) Field of Classification Search
CPC ..... H04W 4/025; H04W 24/10; H04W 36/32; H04W 36/322; H04W 40/20; H04W 64/00; H04W 64/003; H04W 72/232; G01S 5/0009; G01S 5/0018; G01S 5/0027; G01S 5/0036; G01S 5/0045; G01S 5/0054; G01S 5/0063; G01S 5/009
USPC ............ 455/404.2, 414.2, 440, 456.1, 456.3, 455/456.5, 456.6; 370/331, 332; 375/224, 260
See application file for complete search history.

(56) References Cited

U.S. PATENT DOCUMENTS

2021/0368538 A1* 11/2021 Yerramalli ............ G01S 5/0045
2022/0015058 A1* 1/2022 Li ......................... G01S 5/0236
2022/0295441 A1* 9/2022 Michalopoulos ....... H04W 4/02
(Continued)

FOREIGN PATENT DOCUMENTS

CN 112866898 A 5/2021
WO WO 2020114334 A1 6/2020
WO WO 2020119727 A1 6/2020
(Continued)

OTHER PUBLICATIONS

Intel Corporation "Solution directions to reduce end-to-end latency" 3GPP TSG-RAN WG2 Meeting #112 electronic, R2-2009023, Nov. 2020, 12 pages.

(Continued)

*Primary Examiner* — Young T. Tse
(74) *Attorney, Agent, or Firm* — Cozen O'Connor

(57) ABSTRACT

A positioning measurement method, performed by a terminal, including: receiving first indication information from a network device, the first indication information including at least one positioning status identity (ID); and determining a positioning configuration corresponding to the at least one positioning status ID, and performing positioning measurement and reporting according to the positioning configuration.

20 Claims, 2 Drawing Sheets receiving first indication information from a network device, the first indication information including at least one positioning status number — S201

↓ determining a positioning configuration corresponding to the at least one positioning status number, and performing positioning measurement and reporting according to the positioning configuration — S202

(56) References Cited

U.S. PATENT DOCUMENTS

2023/0262648 A1* 8/2023 Thomas ................ H04W 64/00
455/456.1

FOREIGN PATENT DOCUMENTS

WO WO 2020145700 A1 7/2020
WO WO-2021063198 A1 * 4/2021 ............ H04W 56/00

OTHER PUBLICATIONS

CATT "Gathering of latency enhancement solutions (CATT)" 3GPP TSG-RAN WG2 Meeting #112-e, R2-2010868, Nov. 2020, 29 pages.
Chinese Patent Application No. 202180002438.1, First Office Action dated Dec. 21, 2023, 8 pages.
Chinese Patent Application No. 202180002438.1, English translation of First Office Action dated Dec. 21, 2023, 8 pages.
European Patent Application No. 21952444.4, extended Search and Opinion dated Aug. 16, 2024, 8 pages.
Chinese Patent Application No. 202180002438.1, First Office Action dated May 31, 2024, 7 pages.
Chinese Patent Application No. 202180002438.1, English translation of First Office Action dated May 31, 2024, 7 pages.
PCT/CN2021/111325, International Search Report dated Apr. 26, 2022, 2 pages.

* cited by examiner

POSITIONING MEASUREMENT METHOD AND APPARATUS THEREFOR

CROSS REFERENCE TO RELATED APPLICATIONS

This application is a U.S. national phase of International Application No. PCT/CN2021/111325, filed on Aug. 6, 2021, the entire contents of which are incorporated herein by reference.

TECHNICAL FIELD

The disclosure relates to a field of communication technology, and more particularly, to a positioning measurement method and an apparatus thereof.

BACKGROUND

In wireless communication, a downlink positioning reference signal (PRS) can be periodically sent between terminals for measurement. One cycle of the PRS can be several slots. A measurement gap can be configured via a Radio Resource Control (RRC) signaling, and measurement reporting can be configured through a location management function (LMF) entity. This method may have a large reporting delay.

SUMMARY

According to a first aspect of embodiments of the disclosure, a positioning measurement method, performed by a terminal, is provided. The method includes: receiving first indication information from a network device, the first indication information including at least one positioning status ID; and

- determining a positioning configuration corresponding to the at least one positioning status ID, and performing positioning measurement and reporting according to the positioning configuration.

According to a second aspect of embodiments of the disclosure, a positioning measurement method, performed by a network device, is provided. The method includes:

- sending first indication information to a terminal, in which the first indication information includes at least one positioning status ID, and the positioning status ID corresponds to at least one positioning configuration; and
- receiving positioning report information fed back by the terminal.

According to a third aspect of embodiments of the disclosure, a communication device is provided. The communication device includes: a processor and a memory having a computer program stored thereon. When the processor executes the computer program stored in the memory, the communication device is caused to implement the method described in the first aspect above.

According to a fourth aspect of embodiments of the disclosure, a communication device is provided. The communication device includes: a processor and a memory having a computer program stored thereon. When the processor executes the computer program stored in the memory, the communication device is caused to implement the method described in the second aspect above.

BRIEF DESCRIPTION OF THE DRAWINGS

In order to clearly illustrate technical solutions of embodiments of the disclosure or background technologies, a description of drawings used in the embodiments or the background technologies is given below.

DETAILED DESCRIPTION

For ease of understanding, terms involved in this disclosure are introduced at first.

1. Downlink Control Information (DCI)

The DCI is carried by a physical downlink control channel (PDCCH). The DCI can include uplink and downlink resource allocation, hybrid automatic repeat request (HARQ) information, power control, etc. The PDCCH is a physical channel for carrying downlink scheduling information.

2. Positioning Measurement

Positioning measurement requires measuring at least one of:

- downlink time difference of arrival (DL-TDoA): a positioning reference signal (PRS) is introduced in the NR Rel-16 system for a terminal to perform downlink reference signal time difference (DL RSTD) measurement on the PRS of each network device, and to report a measurement result to a position server;
- uplink time difference of arrival (UL-TDoA): enhanced Release-16 sounding reference signal (SRS) allows each base station to measure an uplink relative time of arrival (UL-RToA) and report a measurement result to the position server;
- downlink angle-of-departure (DL AoD): the terminal measures a downlink reference signal receiving power (DL RSRP) of each base station. The base station informs a location management function (LMF) entity of a beam direction angle of each reference signal. The LMF entity estimates a position of the terminal according to a measurement report of the terminal and the beam direction angle information of the base station;
- uplink angle-of-arrival (UL-AoA): the base station measures an angle-of-arrival (AoA) according to a reference signal sent by the terminal, and a measurement report is sent to the position server;
- round trip time (RTT) between cells: the terminal measures a difference, i.e., Rx-Tx, between a reception time point and a transmission time point of a signal between the terminal and each base station, and/or, each base station measures a difference, i.e., Rx-Tx, between a reception time point and a transmission time point of a signal between the base station and the terminal. The measurement reports from the terminal and the base station are sent to the position server to determine the RTT of each cell and obtain the position of the terminal; or
- enhanced cell ID (E-CID), which is based on measurement of radio resource management (RRM) (e.g. DL RSRP) for each base station performed by the terminal. The measurement report is sent to the position server.

In order to better understand the positioning measurement method disclosed by the embodiments of the disclosure, a communication system to which embodiments of the disclosure can be applied is described below.

Figure 1:
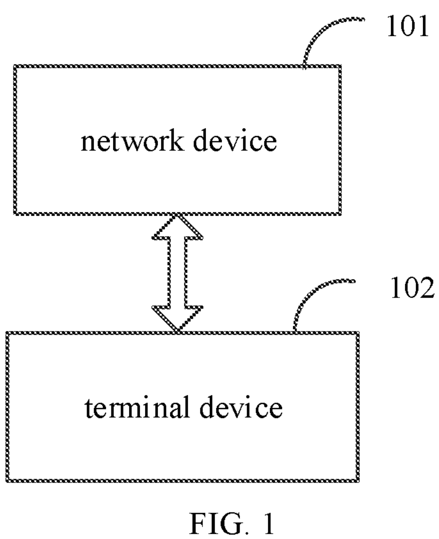
FIG. 1 is a schematic diagram of a communication system provided by an embodiment of the disclosure.

As illustrated in FIG. 1, FIG. 1 is a schematic diagram of a communication system provided by an embodiment of the disclosure. The communication system may include, but is not limited to, a network device and a terminal. The number and form of devices shown in FIG. 1 are only for examples and do not constitute a limitation on the embodiments of the disclosure, and two or more network devices and two or more terminals may be included in practical applications. The communication system shown in FIG. 1 may include, for example, a network device 101 and a terminal 102.

It should be noted that a technical solution of the embodiments of the disclosure can be used in various communication systems, such as, a long term evolution (LTE) system, a 5G mobile communication system, a 5G new radio (NR) system, or other future new mobile communication systems. It is also noted that sidelink in the embodiments of the disclosure may also be called a side link or a direct link.

The network device 101 in the embodiments of the disclosure is an entity on a network for transmitting or receiving signals. For example, the network device 101 may be an evolved NodeB (eNB), a transmission reception point (TRP), a next generation NodeB (gNB) in a NR system, a base station in other future mobile communication systems, or an access node in a wireless fidelity (Wi-Fi) system. The specific technology and specific device form adopted by the network device are not limited in the embodiments of the disclosure. The network device provided by the embodiments of the disclosure may be composed of a central unit (CU) and distributed units (DUs). The CU may also be called a control unit. By using the CU-DU structure, a protocol layer of the network device, such as a base station, may be be split, some functions of the protocol layer are placed in the CU for centralized control, and some or all of the remaining functions of the protocol layer are distributed in the DUs, which are intensively controlled by the CU.

The terminal 102 in the embodiments of the disclosure is an entity on a user side for receiving or transmitting signals, such as a cellular phone. The terminal may also be referred to as a terminal device, a user equipment (UE), a mobile station (MS), a mobile terminal (MT), and the like. The terminal can be a vehicle with communication functions, a smart car, a mobile phone, a wearable device, a Pad, a computer with a wireless transceiver function, a virtual reality (VR) terminal, an augmented reality (AR) terminal, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, etc. The specific technology and specific device form adopted by the terminal are not limited in the embodiments of the disclosure.

A downlink PRS is newly defined in the NR Rel-16 system. The PRS mainly refers to a PRS that supports periodic transmission, and repeated transmission of PRS resources within a cycle is supported. The repeated transmission is further configured according to a number of repeated transmissions within the cycle and a time interval between any two adjacent transmissions. The time interval is N slots, where N is a natural number. Depending on different parameters such as a frequency band and a subcarrier spacing, an absolute time length of each slot varies. The slot is a unit for dividing resources in the time domain. One slot can also be divided into 14 symbols. Therefore, currently, the PRS can only be sent once in one slot. A number of symbols occupied by the PRS can be 2, 4, 6, or 12 consecutive symbols in the slot. A starting symbol position may be any of the 1st to 13th symbols in the slot.

A measurement gap is configured by a Radio Resource Control (RRC) signaling. Measurement reporting is configured by sending a configuration signaling by the LMF entity, which cause a large reporting delay of positioning measurement.

It is understood that the communication system described in the embodiments of the disclosure is intended to more clearly illustrate the technical solutions of the embodiments of the disclosure, and does not constitute a limitation on the technical solutions provided by the embodiments of the disclosure. It is understood by those skilled in the art that as the system architecture evolves and new service scenarios emerge, the technical solutions provided by the embodiments of the disclosure are also applicable to similar technical problems.

A positioning measurement method and a positioning measurement apparatus provided by the disclosure will be introduced in detail below with reference to the accompanying drawings.

Figure 2:
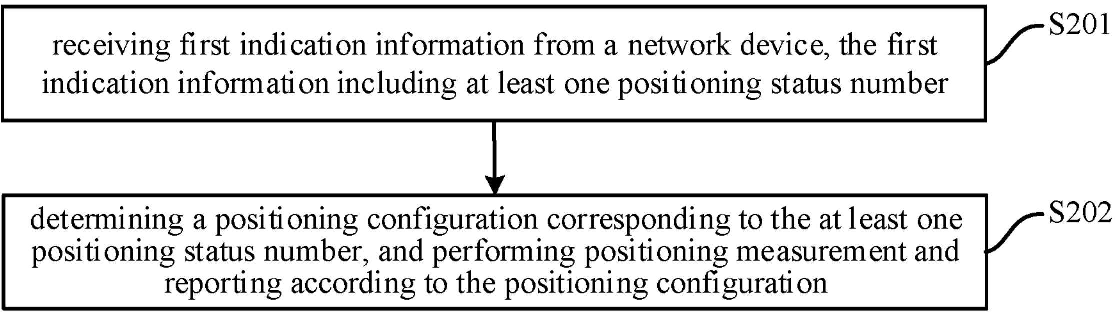
FIG. 2 is a flowchart of a positioning measurement method provided by an embodiment of the disclosure.

FIG. 2 is a flowchart of a positioning measurement method provided by an embodiment of the disclosure. As illustrated in FIG. 2, the method includes, but is not limited to, the following steps.

At step S201, first indication information is received from a network device, in which the first indication information includes at least one positioning status identity (ID). The positioning status ID is also known as an ID of a positioning status. Different positioning status IDs correspond to different positioning configurations.

In embodiments of the disclosure, the terminal receives the first indication information sent by the network device. The first indication information includes at least one positioning status ID. The positioning status ID corresponds to a positioning configuration. The positioning configuration information includes at least one of: PRS configuration information, configuration information of a measurement gap, or configuration information of positioning result reporting.

At step S202, a positioning configuration corresponding to the at least one positioning status ID is determined, and positioning measurement and reporting is performed according to the positioning configuration.

After determining the positioning configuration corresponding to the positioning status ID in the first indication information, the terminal performs the positioning measurement according to the positioning configuration, and reports a measurement result to the network device, to determine positioning information of the terminal.

The positioning status configuration corresponding to the positioning status ID is obtained according to the first indication information, and the positioning status configuration is integrated and corresponded to the positioning status ID, thereby reducing the reporting delay and avoiding the positioning delay.

The first indication information is received from the network device. The first indication information includes at least one positioning status ID. The first indication information is indicated by a Media Access Control (MAC) Control Element (CE) and/or DCI.

In embodiments of the disclosure, the first indication information is indicated by the MAC CE and/or the DCI. Different positioning status numbers, i.e., positioning status IDs, correspond to different positioning configurations.

The corresponding positioning status ID is obtained according to the first indication information indicated by the MAC CE and/or the DCI. The corresponding positioning status configuration is obtained according to the positioning status ID, and the positioning status configuration is integrated and corresponded to the positioning status ID, thereby reducing the reporting delay and avoiding the positioning delay.

The positioning configuration corresponding to the at least one positioning status ID is determined, and positioning measurement and reporting is performed according to the positioning configuration. Determining the positioning configuration corresponding to the at least one positioning status ID includes:

receiving second indication information, in which the second indication information includes the positioning configuration corresponding to the positioning status ID, and the second indication information is indicated by a RRC signaling and/or a New Radio Positioning Protocol (NRPPa) signaling.

In embodiments of the disclosure, a purpose of NRPPa transmission is to transmit the NRPPa signaling between a Next Generation radio access network (NG-RAN) and an LMF entity over a Next Generation (NG) interface. The NRPPa signaling is a related signaling between the terminal and the LMF entity.

Optionally, the MAC CE can be used to activate or de-activate the at least one positioning status ID contained in the second indication information, or the DCI can be used to trigger or stop the at least one positioning status ID contained in the first indication information and/or the second indication information.

The positioning status configuration corresponding to the positioning status ID is obtained according to the second indication information indicated by the RRC signaling and/or the NRPPa signaling. The positioning status configuration is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration includes at least one of:

PRS configuration information;

configuration information of a measurement gap; or configuration information of positioning result reporting.

In embodiments of the disclosure, the PRS configuration information includes: PRS ID information and/or PRS periodic information. The PRS ID information is used to configure at least one of a set ID, a resource ID, a time domain position, a frequency domain position, or a sequence ID of a PRS. Different PRS numbers, i.e., PRS IDs correspond to different PRSs.

The PRS periodic information is used to configure periodic information of a PRS. The periodic information includes at least one of: periodic transmission information, non-periodic transmission information, or semi-persistent transmission information. The positioning configuration includes the configuration information of a measurement gap.

The positioning configuration corresponding to the at least one positioning status ID is determined, and the positioning measurement and reporting is performed according to the positioning configuration. The positioning configuration at least includes the PRS configuration information. The PRS configuration information includes at least one of:

PRS ID information; or

PRS periodic information.

In embodiments of the disclosure, the PRS ID information is used to configure at least one of a set ID, a resource ID, a time domain position, a frequency domain position, or a sequence ID corresponding to the PRS.

The PRS periodic information is used to configure the periodic information of the PRS. The periodic information includes at least one of: periodic transmission information, non-periodic transmission information, or semi-persistent transmission information. Different PRS numbers, i.e., PRS IDs correspond to different PRSs.

The semi-persistent transmission information is configured to indicate that the PRS is transmitted semi-persistently. That is, the PRS is transmitted periodically starting from a certain time point, and the transmission is stopped after transmitting for N times or after receiving transmission-stop indication information.

The positioning configuration corresponding to the at least one positioning status ID is determined, and the positioning measurement and reporting is performed according to the positioning configuration. The positioning configuration at least includes the PRS configuration information. The PRS configuration information at least includes PRS ID information. The PRS ID information includes at least one of:

PRS resource set ID configuration information;

PRS resource ID configuration information;

PRS time domain configuration information;

PRS frequency domain configuration information; or

PRS sequence ID configuration information.

In embodiments of the disclosure, the PRS ID information is used to indicate the PRS resource set ID configuration information and/or the PRS resource ID configuration information and/or the PRS time domain configuration information and/or the PRS frequency domain configuration information and/or the PRS sequence ID configuration information. Different PRS resource set numbers, i.e., PRS resource set IDs, correspond to different PRS resource sets. Different PRS resource numbers, i.e., PRS resource IDs, correspond to different PRS resources. Different PRS sequence numbers, i.e., PRS sequence IDs, correspond to different PRS sequences.

The positioning configuration corresponding to the at least one positioning status ID is determined, and the positioning measurement and reporting is performed according to the positioning configuration. The positioning configuration at least includes the PRS configuration information. The PRS configuration information at least includes the PRS periodic information. The PRS periodic information includes at least one of:

periodic transmission configuration information;

non-periodic transmission configuration information; or semi-persistent transmission configuration information.

In embodiments of the disclosure, the PRS periodic information includes at least one of periodic transmission information, non-periodic transmission information, or semi-persistent transmission information. The semi-persistent transmission information is used to indicate that the PRS is transmitted semi-persistently. That is, the PRS is transmitted periodically starting from a certain time point, and the transmission is stopped after transmitting for N times or after receiving transmission-stop indication information.

The positioning configuration corresponding to the at least one positioning status ID is determined, and the positioning measurement and reporting is performed according to to the positioning configuration. The positioning configuration at least includes the configuration information of a measurement gap. The configuration information of a measurement gap includes at least one of:

- cycle configuration information of the measurement gap;
- starting position configuration information of the measurement gap; or
- duration configuration information of the measurement gap.

In embodiments of the disclosure, the configuration information of a measurement gap includes at least one of the cycle configuration information of the measurement gap, the starting position configuration information of the measurement gap, or the duration configuration information of the measurement gap. Optionally, a cycle of the measurement gap is 10 ms, 20 ms, 40 ms, or 80 ms. An offset value of a starting position of the measurement gap indicates at which slot in the cycle the measurement gap starts. A duration of the measurement gap refers to a time length of the gap, for example, 6 ms, 3 ms, and so on.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting includes at least one of:

- periodic configuration information of the positioning result reporting;
- type configuration information of a reporting result; or
- configuration information of a physical uplink control channel and/or a physical uplink shared channel configuration information used for reporting.

In embodiments of the disclosure, the configuration information of the positioning result reporting is used for reporting the positioning result. The configuration information of the positioning result reporting includes at least one of the periodic configuration information of the positioning result reporting, the type configuration information of the reporting result, or the configuration information of the physical uplink control channel and/or the physical uplink shared channel used for reporting.

The reporting of the positioning result is configured by the configuration information of the positioning result reporting. The configuration information of the positioning result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of the positioning result reporting. The configuration information of positioning result reporting at least includes the periodic configuration information of the positioning result reporting. The periodic configuration information of the positioning result reporting includes at least one of:

- configuration information of periodic reporting;
- configuration information of non-periodic reporting; or
- configuration information of semi-persistent reporting.

In embodiments of the disclosure, the periodic configuration information of the positioning result reporting is used to indicate the reporting periodicity of the terminal. The periodic configuration information of the positioning result reporting includes at least one of: configuration information of periodic reporting, configuration information of non-periodic reporting, or configuration information of semi-persistent reporting. The semi-persistent transmission information is used to indicate the terminal to report the positioning result semi-persistently. That is, the PRS is transmitted periodically starting from a certain time point, and the transmission is stopped after the PRS is transmitted for N times or after receiving a transmission-stop indication information.

The reporting of the positioning result is configured with the periodic configuration information of the positioning result reporting. The periodic configuration information of result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting at least includes the type configuration information of a reporting result. The type configuration information of the reporting result includes at least one of:

- configuration information of angle information reporting;
- configuration information of time information reporting;
- configuration information of signal strength reporting, in which the configuration information of signal strength reporting includes configuration information of reference signal receiving power (RSRP) reporting; or
- configuration information of phase reporting, in which the configuration information of phase reporting includes configuration information of signal phase reporting and/or carrier phase reporting of a reference signal.

In embodiments of the disclosure, the type configuration information of the reporting result is used to indicate a type of the positioning result reported to the network device. The type configuration information of the reporting result is used to indicate a type of the positioning result. The type configuration information of the reporting result includes at least one of: the configuration information of angle information reporting, the configuration information of time information reporting, the configuration information of signal strength reporting, or the configuration information of phase reporting. The configuration information of phase reporting includes the configuration information of signal phase reporting and/or carrier phase reporting of a reference signal. The configuration information of signal strength reporting includes the configuration information of RSRP reporting.

The reporting of the positioning result is configured by the type configuration information of the reporting result reporting. The type configuration information of the result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting at least includes: the type configuration information of the reporting result. The type configuration information of the reporting result at least includes: the configuration information of angle information reporting. The configuration information of angle information reporting includes at least one of:

configuration information of AoA reporting;

configuration information of AoD reporting;

configuration information of horizontal angle reporting;

configuration information of vertical angle reporting;

configuration information of local coordinate system-based angle reporting; or configuration information of global coordinate system-based angle reporting.

In embodiments of the disclosure, the configuration information of angle information reporting is used to indicate angle information reported to the network device. The configuration information of angle information reporting includes at least one of: the configuration information of AoA reporting, the configuration information of AoD reporting, the configuration information of horizontal angle reporting, the configuration information of vertical angle reporting, the configuration information of local coordinate system-based angle reporting, or the configuration information of global coordinate system-based angle reporting.

The reporting of the positioning result is configured with the configuration information of angle information reporting. The configuration information of angle information reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes: the configuration information of positioning result reporting. The configuration information of positioning result reporting at least includes the type configuration information of a reporting result. The type configuration information of a reporting result at least includes the configuration information of time information reporting. The configuration information of time information reporting includes at least one of:

configuration information of time of arrival (ToA) reporting;

configuration information of time difference of arrival (TDoA) reporting; or configuration information of RTT reporting.

In embodiments of the disclosure, the configuration information of time information reporting is used to indicate time information reported by the terminal. The configuration information of time information reporting includes at least one of: the configuration information of ToA reporting, the configuration information of TDoA reporting, or the configuration information of RTT reporting.

The reporting of the positioning result is configured by the configuration information of time information reporting. The configuration information of time information reporting is integrated and corresponded to the positioning status ID, thereby reducing the reporting delay and avoiding the positioning delay.

Figure 3:
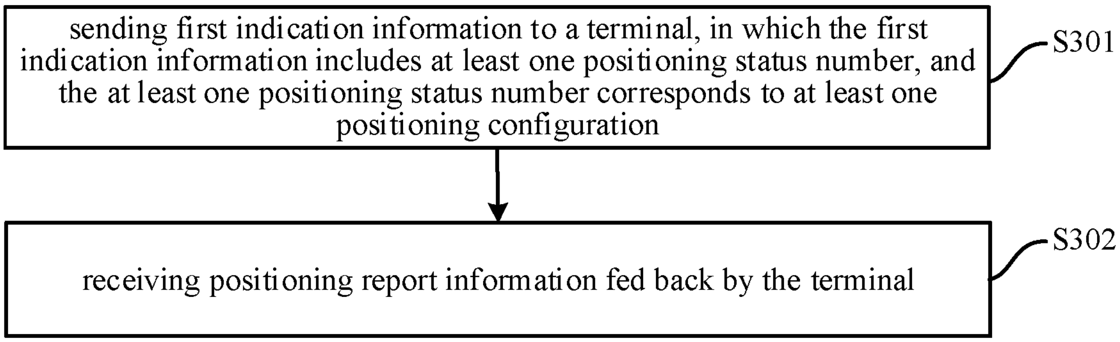
FIG. 3 is a flowchart of a positioning measurement method provided by an embodiment of the disclosure.

FIG. 3 is a flowchart of a positioning measurement method provided by an embodiment of the disclosure. As illustrated in FIG. 3, the method includes but is not limited to the following steps.

At step S301, first indication information is sent to a terminal, in which the first indication information includes at least one positioning status ID, and the positioning status ID corresponds to at least one positioning configuration.

In embodiments of the disclosure, the network device sends the first indication information to the terminal. The first indication information includes at least one positioning status ID. The positioning status ID corresponds to the positioning configuration. The positioning configuration information includes at least one of: PRS configuration information, configuration information of a measurement gap, or configuration information of positioning result reporting. Different positioning status numbers, i.e., positioning status IDs, correspond to different positioning configurations.

At step S302, positioning report information fed back by the terminal is received.

After determining the positioning configuration corresponding to the positioning status ID in the first indication information, the terminal performs the positioning measurement according to the positioning configuration, and reports a measurement result to the network device. The network device determines positioning information of the terminal according to the measurement result.

The positioning status configuration corresponding to the positioning status ID is obtained by sending the first indication information. The positioning status configuration is integrated and corresponded to the positioning status ID. Positioning is performed according to the positioning report information fed back by the terminal, thereby reducing the reporting delay and avoiding the positioning delay.

In the above embodiments of the disclosure, the methods according to the embodiments of the disclosure are described from the perspectives of the network device and the terminal, respectively. In order to realize each of the functions in the methods according to the above embodiments of the disclosure, the network device and the terminal may include a hardware structure, a software module, and realize each of the above functions in the form of a hardware structure, a software module, or a combination of the hardware structure and the software module. A certain function of the above functions may be performed in the form of the hardware structure, the software module, or a combination of the hardware structure and the software module.

Figure 4:
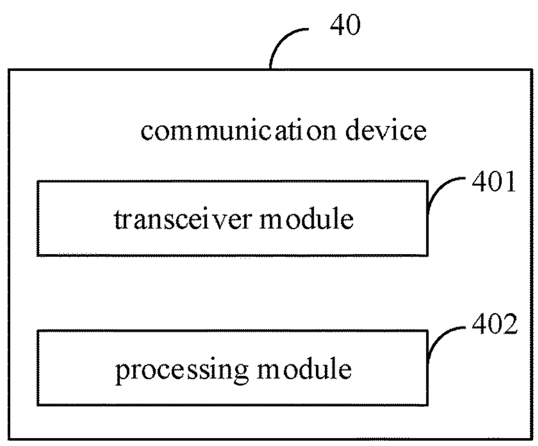
FIG. 4 is a block diagram of a communication device provided by an embodiment of the disclosure.

FIG. 4 is a block diagram of a communication device 40 provided by an embodiment of the disclosure. The communication device 40 has part or all of the functions of the terminal for implementing the method described in the first aspect. For example, the functions of the communication device may have the functions of some or all in the embodiments of the disclosure, or may have the function of independently implementing any embodiment of the disclosure. The functions can be implemented by hardware, or can be implemented by executing corresponding software using the hardware. The hardware or software includes one or more units or modules corresponding to the above functions.

As an example, the processing module 402 may be a processor. The transceiver module 401 may be a transceiver or a communication interface. The storage module may be a memory.

The communication device 40 shown in FIG. 4 may include a transceiver module 401 and a processing module 402. The transceiver module 401 may include a transmitting module and/or a receiving module. The transmitting module is used to implement a transmitting function, and the receiving module is used to implement a receiving function. The transceiver module 401 may implement the transmitting function and/or the receiving function.

The processing module 402 is configured to support the communication device to perform corresponding functions in the above method. The transceiver module 401 is used to support communication between the communication device and other devices. The communication device may further include a storage module coupled to the transceiver module 401 and the processing module 402. The storage module is configured to store computer programs and data necessary for the communication device 40.

The communication device 40 may be a terminal (e.g., the terminal in the preceding method embodiments), a device in the terminal, or a device that can be used with the terminal. Alternatively, the communication device 40 may be a network device, a device in the network device, or a device that can be used with the network device.

The communication device 40, serving as a terminal (e.g., the terminal in the preceding method embodiments), includes:

a receiving module, configured to receive first indication information from a network device, the first indication information including at least one positioning status ID.

In embodiments of the disclosure, the terminal receives the first indication information sent by the network device. The first indication information includes at least one positioning status ID. The positioning status ID corresponds to the positioning configuration. The positioning configuration information includes at least one of PRS configuration information, configuration information of a measurement gap, or configuration information of positioning result reporting. Different positioning status numbers, i.e., positioning status IDs, correspond to different positioning configurations.

The communication device 40 also includes: a reporting module, configured to determine a positioning configuration corresponding to the at least one positioning status ID, and perform positioning measurement and reporting according to the positioning configuration.

After determining the positioning configuration corresponding to the positioning status ID in the first indication information, the terminal performs positioning measurement according to the positioning configuration, and reports a measurement result to the network device, to determine positioning information of the terminal.

The positioning status configuration corresponding to the positioning status ID is obtained according to the first indication information, and the positioning status configuration is integrated and corresponded to the positioning status ID, thereby reducing the reporting delay and avoiding the positioning delay.

The first indication information is received from the network device. The first indication information includes at least one positioning status ID. The first indication information is indicated by a MAC CE and/or DCI.

In embodiments of the disclosure, the first indication information is indicated by the MAC CE and/or the DCI.

The corresponding positioning status ID is obtained according to the first indication information indicated by the MAC CE and/or the DCI. The corresponding positioning status configuration is obtained according to the positioning status ID, and the positioning status configuration is integrated and corresponded to the positioning status ID, thereby reducing the reporting delay and avoiding the positioning delay.

The positioning configuration corresponding to the at least one positioning status ID is determined, and positioning measurement and reporting is performed according to the positioning configuration. The reporting module includes:

a receiving sub-module, configured to receive second indication information. The second indication information includes the positioning configuration corresponding to the positioning status ID, and the second indication information is indicated by a RRC signaling and/or a NRPPa signaling.

In embodiments of the disclosure, a purpose of NRPPa transmission is to transmit the NRPPa signaling between a NG-RAN and an LMF entity over a NG interface. The NRPPa signaling is a related signaling between the terminal and the LMF entity. Different positioning status numbers, i.e., positioning status IDs, correspond to different positioning configurations.

Optionally, the MAC CE can be used to activate or de-activate at least one positioning status ID contained in the second indication information, or the DCI can be used to trigger or stop at least one positioning status ID contained in the first indication information and/or the second indication information.

The positioning status configuration corresponding to the positioning status ID is obtained according to the second indication information indicated by the RRC signaling and/or the NRPPa signaling. The positioning status configuration is integrated and corresponded to the positioning status ID, thereby reducing the reporting delay and avoiding the positioning delay. Different positioning status numbers, i.e., positioning status IDs, correspond to different positioning configurations. Different positioning status numbers, i.e., positioning status IDs, correspond to different positioning configurations.

The positioning configuration corresponding to the at least one positioning status ID is determined, and the positioning measurement and reporting is performed according to the positioning configuration. The positioning configuration includes at least one of:

PRS configuration information;

configuration information of a measurement gap; or configuration information of positioning result reporting.

In the embodiment of the disclosure, the PRS configuration information includes: PRS ID information and/or PRS periodic information. The PRS ID information is used to configure at least one of: a set ID, a resource ID, a time domain position, a frequency domain position, or a sequence ID of a PRS. The PRS periodic information is used to configure periodic information of the PRS. The periodic information includes at least one of: periodic transmission information, non-periodic transmission information, or semi-persistent transmission information. The positioning configuration includes the configuration information of a measurement gap.

The positioning configuration corresponding to the at least one positioning status ID is determined, and the positioning measurement and reporting is performed according to the positioning configuration. The positioning configuration at least includes the PRS configuration information. The PRS configuration information includes at least one of:

PRS ID information; or

PRS periodic information.

In embodiments of the disclosure, the PRS ID information is used to configure at least one of a set ID, a resource ID, a time domain position, a frequency domain position, or a sequence ID corresponding to the PRS.

The PRS periodic information is used to configure the periodic information of the PRS. The periodic information includes at least one of: periodic transmission information, non-periodic transmission information, or semi-persistent transmission information. The semi-persistent transmission information is configured to indicate that the PRS is transmitted semi-persistently. That is, the PRS is transmitted periodically starting from a certain time point, and the transmission is stopped after transmitting for N times or after receiving a transmission-stop indication information.

The positioning configuration corresponding to the at least one positioning status ID is determined, and the positioning measurement and reporting is performed according to the positioning configuration. The positioning configuration at least includes the PRS configuration information. The PRS configuration information at least includes the PRS ID information. The PRS ID information includes at least one of:

PRS resource set ID configuration information;
PRS resource ID configuration information;
PRS time domain configuration information;
PRS frequency domain configuration information; or
PRS sequence ID configuration information.

In embodiments of the disclosure, the PRS ID information is used to indicate the PRS resource set ID configuration information and/or the PRS resource ID configuration information and/or the PRS time domain configuration information and/or the PRS frequency domain configuration information and/or the PRS sequence ID configuration information. Different PRS resource set numbers, i.e., PRS resource set IDs, correspond to different PRS resource sets. Different PRS resource numbers, i.e., PRS resource IDs, correspond to different PRS resources. Different PRS sequence numbers, i.e., PRS sequence IDs, correspond to different PRS sequences.

The positioning configuration corresponding to the at least one positioning status ID is determined, and the positioning measurement and reporting is performed according to the positioning configuration. The positioning configuration at least includes the PRS configuration information. The PRS configuration information at least includes the PRS periodic information. The PRS periodic information includes at least one of:

periodic transmission configuration information;
non-periodic transmission configuration information; or
semi-persistent transmission configuration information.

In embodiments of the disclosure, the PRS periodic information includes at least one of periodic transmission information, non-periodic transmission information, or semi-persistent transmission information. The semi-persistent transmission information is used to indicate that the PRS is transmitted semi-persistently. That is, the PRS is transmitted periodically starting from a certain time point, and the transmission is stopped after transmitting for N times or after receiving a transmission-stop indication information.

The positioning configuration corresponding to the at least one positioning status ID is determined, and the positioning measurement and reporting is performed according to the positioning configuration. The positioning configuration at least includes configuration information of a measurement gap. The configuration information of a measurement gap includes at least one of:

cycle configuration information of the measurement gap;
starting position configuration information of the measurement gap; or
duration configuration information of the measurement gap.

In embodiments of the disclosure, the configuration information of the measurement gap includes at least one of the cycle configuration information of the measurement gap, the starting position configuration information of the measurement gap, or the duration configuration information of the measurement gap. Optionally, a cycle of the measurement gap period is 10 ms, 20 ms, 40 ms, or 80 ms. An offset value of a starting position of the measurement gap indicates at which slot in the cycle the measurement gap starts. A duration of the measurement gap refers to a time length of the gap, for example, 6 ms, 3 ms, and so on.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting includes at least one of:

periodic configuration information of the positioning result reporting;
type configuration information of a reporting result; or
configuration information of a physical uplink control channel and/or a physical uplink shared channel configuration information used for reporting.

In embodiments of the disclosure, the configuration information of the positioning result reporting is used for reporting the positioning result. The configuration information of the positioning result reporting includes at least one of the periodic configuration information of the positioning result reporting, the type configuration information of the reporting result, or the configuration information of the physical uplink control channel and/or the physical uplink shared channel used for reporting.

The reporting of the positioning result is configured by the configuration information of the positioning result reporting. The configuration information of the positioning result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of the positioning result reporting. The configuration information of the positioning result reporting at least includes the periodic configuration information of the positioning result reporting. The periodic configuration information of the positioning result reporting includes at least one of:

configuration information of periodic reporting;
configuration information of non-periodic reporting; or
configuration information of semi-persistent reporting.

In embodiments of the disclosure, the periodic configuration information of the positioning result reporting is used to indicate the reporting periodicity of the terminal. The periodic configuration information of the positioning result reporting includes at least one of: configuration information of periodic reporting, configuration information of non-periodic reporting, or configuration information of semi-persistent reporting. The semi-persistent transmission information is used to indicate the terminal to report the positioning result semi-persistently. That is, the PRS is transmitted periodically starting from a certain time point, and the transmission is stopped after the PRS is transmitted for N times or after receiving a transmission-stop indication information.

The reporting of the positioning result is configured with the periodic configuration information of the positioning result reporting. The periodic configuration information of result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting at least includes the type configuration information of a reporting result. The type configuration information of the reporting result includes at least one of:

- configuration information of angle information reporting;
- configuration information of time information reporting;
- configuration information of signal strength reporting, in which the configuration information of signal strength reporting includes configuration information of reference signal receiving power (RSRP) reporting; or
- configuration information of phase reporting, in which the configuration information of phase reporting includes configuration information of signal phase reporting and/or carrier phase reporting of a reference signal.

In embodiments of the disclosure, the type configuration information of the reporting result is used to indicate a type of the positioning result reported to the network device. The type configuration information of the reporting result is used to indicate a type of the positioning result. The type configuration information of the reporting result includes at least one of: the configuration information of angle information reporting, the configuration information of time information reporting, the configuration information of signal strength reporting, or the configuration information of phase reporting. The configuration information of phase reporting includes the configuration information of signal phase reporting and/or carrier phase reporting of a reference signal. The configuration information of signal strength reporting includes the configuration information of RSRP reporting.

The reporting of the positioning result is configured by the type configuration information of the reporting result reporting. The type configuration information of the result reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes the configuration information of positioning result reporting. The configuration information of positioning result reporting at least includes: the type configuration information of the reporting result. The type configuration information of the reporting result at least includes: the configuration information of angle information reporting. The configuration information of angle information reporting includes at least one of:

- configuration information of AoA reporting;
- configuration information of AoD reporting;
- configuration information of horizontal angle reporting;
- configuration information of vertical angle reporting;
- configuration information of local coordinate system-based angle reporting; or
- configuration information of global coordinate system-based angle reporting.

In embodiments of the disclosure, the configuration information of angle information reporting is used to indicate angle information reported to the network device. The configuration information of angle information reporting includes at least one of: the configuration information of AoA reporting, the configuration information of AoD reporting, the configuration information of horizontal angle reporting, the configuration information of vertical angle reporting, the configuration information of local coordinate system-based angle reporting, or the configuration information of global coordinate system-based angle reporting.

The reporting of the positioning result is configured with the configuration information of angle information reporting. The configuration information of angle information reporting is integrated and corresponded to the positioning status ID, thereby reducing the reporting delay and avoiding the positioning delay.

The positioning configuration corresponding to the at least one positioning status ID is determined, and the positioning measurement and reporting is performed according to the positioning configuration. The positioning configuration at least includes: the configuration information of positioning result reporting. The configuration information of positioning result reporting at least includes the type configuration information of a reporting result. The type configuration information of a reporting result at least includes the configuration information of time information reporting. The configuration information of time information reporting includes at least one of:

- configuration information of time of arrival (ToA) reporting;
- configuration information of time difference of arrival (TDoA) reporting; or
- configuration information of RTT reporting.

In embodiments of the disclosure, the configuration information of time information reporting is used to indicate time information reported by the terminal. The configuration information of time information reporting includes at least one of: the configuration information of ToA reporting, the configuration information of TDoA reporting, or the configuration information of RTT reporting.

The reporting of the positioning result is configured by the configuration information of time information reporting. The configuration information of time information reporting is integrated and corresponded to the positioning status ID, thereby reducing the reporting delay and avoiding the positioning delay.

The communication device 40, serving as a network device, includes:

- a sending module, configured to send first indication information to a terminal, in which the first indication information includes at least one positioning status ID, and the positioning status ID corresponds to at least one positioning configuration; and
- a receiving module, configured to receive positioning report information fed back by the terminal.

In a possible implementation, the communication device further includes:

- a sending sub-module, configured to: send second indication information to the terminal, in which the second indication information includes the positioning configuration corresponding to the positioning status ID, and the second indication information is indicated by a RRC signaling and/or a NRPPa signaling. Different positioning status numbers, i.e., positioning status IDs, correspond to different positioning configurations.

Figure 5:
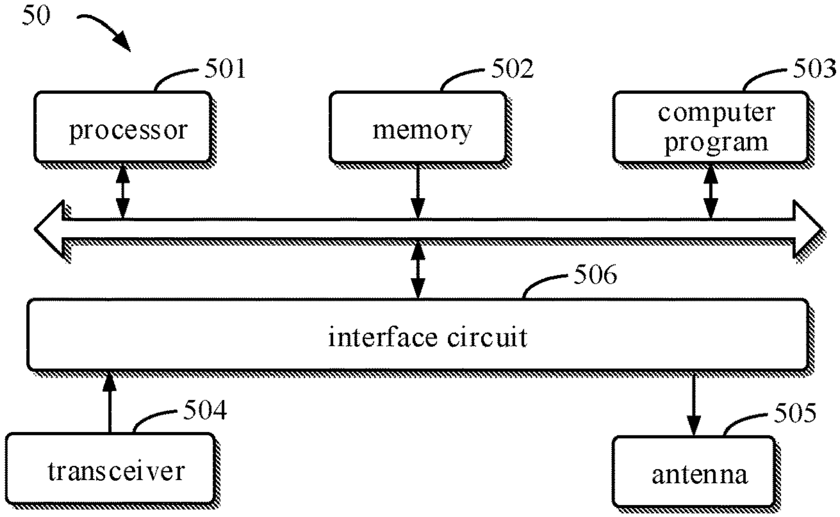
FIG. 5 is a schematic diagram of a communication device provided by an embodiment of the disclosure.

As illustrated in FIG. 5, FIG. 5 is a schematic diagram of a communication device 50 according to an embodiment of the disclosure. The communication device 50 may be a network device, a terminal (e.g., the terminal in the above method embodiments), or a chip, a chip system or a processor that supports the network device to realize the above-described methods, or a chip, a chip system or a processor that supports the terminal to realize the above-described methods. The device may be used to realize the methods described in the above method embodiments with reference to the descriptions of the above-described method embodiments.

The communication device 50 may include one or more processors 501. The processor 501 may be a general purpose processor or a dedicated processor, such as, a baseband processor or a central processor. The baseband processor is used for processing communication protocols and communication data. The central processor is used for controlling the communication device (e.g., a base station, a baseband chip, a terminal, a terminal chip, a DU, or a CU), executing the computer program, and processing data of the computer program.

Optionally, the communication device 50 may include one or more memories 502 on which a computer program 503 may be stored. The processor 501 executes the computer program 503 to cause the communication device 50 to perform the methods described in the above method embodiments. Optionally, data may also be stored in the memory 502. The communication device 50 and the memory 502 may be provided separately or may be integrated together.

Optionally, the communication device 50 may also include a transceiver 504 and an antenna 505. The transceiver 504 may be referred to as a transceiver unit, a transceiver machine, or a transceiver circuit, for realizing the transceiver function. The transceiver 504 may include a receiver and a transmitter. The receiver may be referred to as a receiver machine or a receiving circuit, for realizing the receiving function. The transmitter may be referred to as a transmitter machine or a transmitting circuit, for realizing the transmitting function.

Optionally, the communication device 50 may also include one or more interface circuits 506. The interface circuits 506 are used to receive code instructions and transmit them to the processor 501. The processor 501 runs the code instructions to cause the communication device 50 to perform the method described in the above method embodiments.

The communication device 50 is a terminal (e.g., the terminal in the preceding method embodiments). The processor 501 is used to perform step S202 in FIG. 2. The transceiver 504 is used to perform step S201 in FIG. 2.

The communication device 50 is a network device. The transceiver 504 is used to perform step S301 and 302 in FIG. 3.

In an implementation, the processor 501 may include a transceiver for implementing the receiving and transmitting functions. The transceiver may be, for example, a transceiver circuit, an interface, or an interface circuit. The transceiver circuit, interface, or interface circuit for implementing the receiving and transmitting functions may be separated or may be integrated together. The transceiver circuit, interface, or interface circuit described above may be used for code/data reading and writing, or may be used for signal transmission or delivery.

In an implementation, the processor 501 may store a computer program 503, which runs on the processor 501 and may cause the communication device 50 to perform the methods described in the method embodiments above. The computer program 503 may be solidified in the processor 501, in which case the processor 501 may be implemented by hardware.

In an implementation, the communication device 50 may include circuits. The circuits may implement the sending, receiving or communicating functions in the preceding method embodiments. The processors and transceivers described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processors and transceivers can also be produced using various IC process technologies such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication device in the above description of embodiments may be a network device or a terminal (e.g., the terminal in the above method embodiments), but the scope of the communication device described in the disclosure is not limited thereto, and the structure of the communication device may not be limited by FIG. 5. The communication device may be a stand-alone device or may be part of a larger device. For example, the described communication device may be:

(1) a stand-alone IC, a chip, a chip system or a subsystem;

(2) a collection of ICs including one or more ICs, optionally, the collection of ICs may also include storage components for storing data and computer programs;

(3) an ASIC, such as a modem;

(4) modules that can be embedded within other devices;

(5) receivers, terminals, smart terminals, cellular phones, wireless devices, handheld machines, mobile units, in-vehicle devices, network devices, cloud devices, artificial intelligence devices, and the like; and (6) others.

Figure 6:
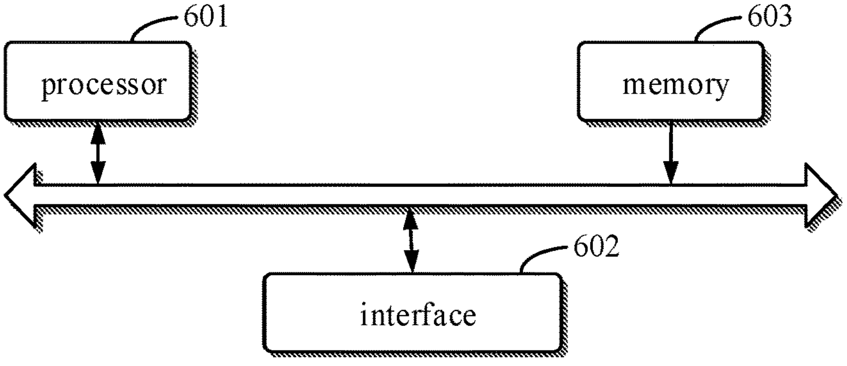
FIG. 6 is a schematic diagram of a chip provided by an embodiment of the disclosure.

The case where the communication device may be a chip or a chip system is described with reference to the schematic structure of the chip shown in FIG. 6. The chip shown in FIG. 6 includes a processor 601 and an interface 602. There may be one or more processors 601, and there may be multiple interfaces 602.

In cases where the chip is used to implement the function of the terminal (e.g., the terminal in the above method embodiments) in the embodiment of the disclosure, the chip is configured to: receive first indication information from a network device, the first indication information including at least one positioning status ID; and determine a positioning configuration corresponding to the at least one positioning status ID, and perform positioning measurement and reporting according to the positioning configuration.

In cases where the chip is used to implement the function of the network device in the embodiment of the disclosure, the interface 602 is configured to send first indication information to a terminal, in which the first indication information includes at least one positioning status ID, and the positioning status ID corresponds to at least one positioning configuration; and receive positioning report information fed back by the terminal.

Optionally, the chip further includes a memory 603 used to store necessary computer programs and data.

It is understandable by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be construed as being beyond the scope of protection of the embodiments of the disclosure.

The disclosure also provides a communication device including: a processor. When the processor calls a computer program stored in a memory, the method described in the above embodiments is implemented.

The embodiments of the disclosure also provide a positioning measurement system. The system includes a communication device serving as a terminal (e.g., the terminal in the above method embodiments) and a communication device serving as a network device in the aforementioned embodiment of FIG. 4. Or, it includes a communication device serving as a terminal (e.g., the terminal in the above method embodiments) and a communication device serving as a network device in the aforementioned embodiment of FIG. 5, or other communication device in the above embodiments.

The disclosure also provides a readable storage medium having an instruction stored thereon. When the instruction is executed by a computer, the function of any of the method embodiments described above is implemented.

The disclosure also provides a computer program product. When the computer program product is executed by a computer, the function of any of the method embodiments described above is implemented.

The disclosure also provides a chip system. The chip system includes at least one processor and an interface, for supporting the terminal in realizing the functions involved in the above embodiments, e.g., determining or processing at least one of data or information involved in the methods described above. In a possible design, the chip system further includes a memory, which is configured to store necessary computer programs and data for the terminal or the network device. The chip system may consist of chips or may include chips and other discrete devices.

The disclosure also provides a computer program. When the computer program runs on a computer, the computer is caused to implement the methods described above.

The above embodiments may be implemented in whole or in part by software, hardware, firmware, or any combination thereof. When implemented using software, it may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., by using coaxial cables, fiber optics, or digital subscriber lines (DSLs) or a wireless manner (e.g., by using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of the embodiments of the disclosure, or used to indicate the order of precedence.

The term "at least one" in the disclosure may also be described as one or more, and the term "multiple" may be two, three, four, or more, which is not limited in the disclosure. In the embodiments of the disclosure, for a type of technical features, "first", "second", and "third", and "A", "B", "C" and "D" are used to distinguish different technical features of the type, the technical features described using the "first", "second", and "third", and "A", "B", "C" and "D" do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the titles of the above tables may be other names that can be understood by the communication device, and the values or representations of the parameters may be other values or representations that can be understood by the communication device. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-fire.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A positioning measurement method, performed by a terminal, comprising:

receiving first indication information from a network device, the first indication information comprising at least one positioning status identity (ID);

determining a positioning configuration corresponding to the at least one positioning status ID; and performing positioning measurement and reporting according to the positioning configuration;

wherein determining the positioning configuration corresponding to the at least one positioning status ID comprises:

receiving second indication information, wherein the second indication information comprises the positioning configuration corresponding to the positioning status ID, and the second indication information is indicated by a Radio Resource Control (RRC) signaling.

2. The method of claim 1, wherein the first indication information is indicated by at least one of a Media Access Control (MAC) Control Element (CE) or Downlink Control Information (DCI).

3. The method of claim 1, wherein the second indication information is further indicated by a New Radio Positioning Protocol (NRPPa) signaling.

4. The method of claim 1, wherein the positioning configuration comprises at least one of:

positioning reference signal (PRS) configuration information;

configuration information of a measurement gap; or configuration information of positioning result reporting.

5. The method of claim 4, wherein the PRS configuration information comprises at least one of:

PRS ID information; or

PRS periodic information.

6. The method of claim 5, wherein the PRS ID information comprises at least one of:

PRS resource set ID configuration information;

PRS resource ID configuration information;

PRS time domain configuration information;

PRS frequency domain configuration information; or

PRS sequence ID configuration information.

7. The method of claim 5, wherein the PRS periodic information comprises at least one of:

periodic transmission configuration information;

non-periodic transmission configuration information; or semi-persistent transmission configuration information.

8. The method of claim 4, wherein the configuration information of the measurement gap comprises at least one of:

cycle configuration information of the measurement gap;

starting position configuration information of the measurement gap; or duration configuration information of the measurement gap.

9. The method of claim 4, wherein the configuration information of positioning result reporting comprises at least one of:

periodic configuration information of the positioning result reporting;

type configuration information of a reporting result; or configuration information of at least one of a physical uplink control channel (PUCCH) or a physical uplink shared channel (PUSCH) configured for reporting.

10. The method of claim 9, wherein the periodic configuration information of the positioning result reporting comprises at least one of:

configuration information of periodic reporting;

configuration information of non-periodic reporting; or configuration information of semi-persistent reporting.

11. The method of claim 9, wherein the type configuration information of the reporting result comprises at least one of:

configuration information of angle information reporting;

configuration information of time information reporting;

configuration information of signal strength reporting, wherein the configuration information of signal strength reporting comprises configuration information of reference signal receiving power reporting; or configuration information of phase reporting, wherein the configuration information of phase reporting comprises configuration information of at least one of signal phase reporting or carrier phase reporting of a reference signal.

12. The method of claim 11, wherein the configuration information of angle information reporting comprises at least one of:

configuration information of angle-of-arrival reporting;

configuration information of angle-of-departure reporting;

configuration information of horizontal angle reporting;

configuration information of vertical angle reporting;

configuration information of local coordinate system-based angle reporting; or configuration information of global coordinate system-based angle reporting.

13. The method of claim 11, wherein the configuration information of time information reporting comprises at least one of:

configuration information of time of arrival reporting;

configuration information of time difference of arrival reporting; or configuration information of round trip time reporting.

14. A positioning measurement method, performed by a network device, comprising:

sending first indication information to a terminal, wherein the first indication information comprises at least one positioning status identity (ID), and the at least one positioning status ID corresponds to at least one positioning configuration;

receiving positioning report information fed back by the terminal; and sending second indication information to the terminal, wherein the second indication information comprises the positioning configuration corresponding to the positioning status ID, and the second indication information is indicated by a Radio Resource Control (RRC) signaling.

15. The method of claim 14, wherein the second indication information is further indicated by a New Radio Positioning Protocol (NRPPa) signaling.

16. A communication device, comprising a processor and a memory having a computer program stored thereon, wherein the processor executes the computer program stored in the memory to perform the method of claim 14.

17. A communication device, comprising a processor and a memory having a computer program stored thereon, wherein the processor is configured to execute the computer program to:

receive first indication information from a network, the first indication information comprising at least one positioning status identity (ID); and determine a positioning configuration corresponding to the at least one positioning status ID, and perform positioning measurement and reporting according to the positioning configuration;

wherein the processor is further configured to execute the computer program to:

receive second indication information, wherein the second indication information comprises the positioning configuration corresponding to the positioning status ID, and the second indication information is indicated by a Radio Resource Control (RRC) signaling.

18. The communication device of claim 17, wherein the first indication information is indicated by at least one of a Media Access Control (MAC) Control Element (CE) or Downlink Control Information (DCI).

19. The communication device of claim 17, wherein second indication information is further indicated by a New Radio Positioning Protocol (NRPPa) signaling.

20. The communication device of claim 17, wherein the positioning configuration comprises at least one of:

positioning reference signal (PRS) configuration information;

configuration information of a measurement gap; or configuration information of positioning result reporting.

* * * * *